United States Patent Office 3,506,579
Patented Apr. 14, 1970

3,506,579
ANTIBACTERIAL COMPOSITIONS CONTAINING AMINOPHOSPHINIC ACIDS AND SALTS
Andrew T. Guttmann, Maple Heights, Ohio, and Eric Jungermann, Chicago, and Warner M. Linfield, Evanston, Ill., assignors to Armour and Company, Chicago, Ill., a corporation of Delaware
No Drawing. Continuation-in-part of application Ser. No. 90,240, Feb. 21, 1961, and a division of application Ser. No. 655,313, July 24, 1967. This application Aug. 26, 1968, Ser. No. 755,381
Int. Cl. C11d 9/50; A61l 23/00
U.S. Cl. 252—107          6 Claims

ABSTRACT OF THE DISCLOSURE

Alpha-(arylamino)-benzylphosphinic acids, alkylamino methylphosphinic acids, and alpha-(alkylamino)-benzylphosphinic acids and the alkali metal or ammonium salts thereof are disclosed as bateriostatic agents. The activity of the alpha-(arylamino)-benzylphosphonic acids are enhanced in alkaline media, such as the water-soluble soaps.

---

This application is a continuation-in-part of our copending application Ser. No. 90,240, filed on Feb. 21, 1961 and now abandoned, and a division of our copending application Ser. No. 655,313, filed on July 24, 1967, now Patent No. 3,424,788.

This invention relates to the control of bacterial growth and more specifically, to a bacteriostatic agent and to the method of use thereof.

A principal object of the present invention is to provide an agent which is useful, especially in combination with soap, as a bacteriostatic or bactericidal agent. Another object is to provide a germicidal agent and a highly effective method of use thereof. Other objects will appear as the specification proceeds.

One aspect of the present invention lies in the discovery that certain aminophosphinic acids have definite antibacterial properties and that these properties increase markedly in the presence of an alkaline agent such as soap. Therefore, a washing operation and a treatment to inhibit bacterial growth may be undertaken simultaneously. The term "soap" refers to the water-soluble metallic, ammonium, or organic base salts of various fatty acids, such as lauric, oleic, myristic, palmitic, stearic and the like. As used in this description, the term is intended to cover all products in which soap is a major constituent, for example, bar, flake, powdered, liquid soaps, shaving creams, cleansing creams, etc.

Aminophosphinic acids and salts thereof which exhibit bacteriostatic properties have been found to be of the general formula:

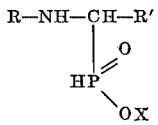

wherein R is selected from the group consisting of alkyl radicals having from 12 to 18 carbon atoms, phenyl radicals and chlorine-substituted phenyl radicals; R' is selected from the group consisting of hydrogen, phenyl, halogen-substituted phenyl, nitro-substituted phenyl and hydroxyl-substituted phenyl radicals; and wherein X is selected from the group consisting of hydrogen, alkali metal and ammonium. Particularly effective results have been obtained where R is a chlorinated phenyl group, although the extent of such effectiveness varies somewhat according to the degree of chlorination and the spatial relationship of the chlorine groups. Preferably, the chlorine groups should be located in the meta or para position rather than in the ortho positions.

With respect to R', antibacterial activity tends to increase with increasing halogen substitution, and such substitution in the meta or para position enhances activity more than in the ortho position. However, with a hydroxyl substitution on the phenyl ring it has been found that substitution in the ortho position results in higher activity than in the para position.

Bacteriostatic agents represented by the general formula given above may be prepared by condensnig a primary amine hydrophosphite with an aldehyde or by reacting a Schiff's base with hypoposphorous acid. It has been found that end products of higher purity are obtained whenever the Schiff's base (resulting from the condensation of a primary amine with a carbonyl compound) is prepared first and followed by the reaction with hypophosphorous acid. In addition, it has been found unnecessary to isolate the Schiff's base prior to reaction with the acid. Thus, the general reaction leading to the formation of the acids is as follows:

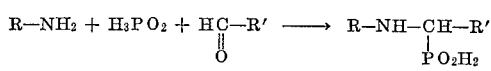

or, when aromatic amines and aldehydes are used,

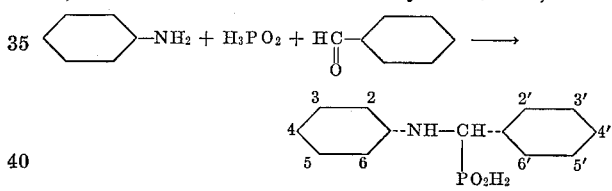

The alkali metal or ammonium salts of the aminophosphinic acids may be conveniently prepared by the addition of approximately equimolar amounts of the appropriate alkali metal or ammonium hydroxides in aqueous solution to the acid. The salt formation is conventional and takes place under standard conditions of temperature and pressure.

When tested for antibacterial activity in a nutrient broth, the inhibition concentration of the alpha-(alkylamino)-benzylphosphonic acids (where R is alkyl), or the water-soluble alkali metal or ammonium salts of such acids is in the order of 250 to 1000 parts per million (p.p.m.). The inhibition concentration of the alpha-(arylamino)-benzylphosphinic acids (where R is a substituted or unsubstituted aryl group) is in the order of 30 to 500 p.p.m. However, if the said alpha-(arylamino)-benzylphosphinic acids are present as their alkali metal or ammonium salts, or if such acids are allowed to act in an alkaline environment such as soap, the inhibition concentration is in the order of 7 to 60 p.p.m. Thus, when utilizing the alkali metal or ammonium salts of the alpha-(arylamino)-benzylphosphonic acids, or when such acids are allowed to act in an alkaline environment such as soap, a substantial reduction of the minimum concentration required for complete inhibition of bacterial growth occurs; and up to a twenty-five fold increase in such activity results.

Relatively small amounts of the antibacterial agents are sufficient to obtain the advantages of this invention. Satisfactory results are obtained when the weight of the antibacterial agent is from 0.5% to 5% of the total weight of the soap composition. The preferred range is a weight concentration in soap of about 1.0% to 3.0%. It should be understood that lesser or greater amounts will be effective, but without further substantial advantages.

The germicidal agents of this invention can be added to soap or other alkaline cleansing agents by any suitable method which results in a uniform distribution of the antibacterial agent throughout the entire mass.

Reference may be had to the following illustrative examples for a more complete understanding of the invention:

EXAMPLE I

The antibacterial properties of the sodium salts of alkylamino methylphosphinic acids and alpha-(alkylamino)benzylphosphinic acids were evaluated in nutrient broth.

A tube dilution test was used by making a number of serial dilutions of the said salts in solution in nutrient broth. The tubes were then inoculated with 0.05 ml. of a 24-hour broth culture of *S. aureus* FDA 209 or of *E. coli* ATTC 11229 and incubated at 37° C. for 24 hours. The minimum inhibitory concentration was then determined.

The minimum inhibitor concentration endpoints for completely inhibiting all bacterial growth are as follows:

| R—NH—CH—R′ <br> $\quad\quad$ H—P=O <br> $\quad\quad\quad\quad$ \ONa | | Minimum concentration (in p.p.m.) required to inhibit growth of— | |
|---|---|---|---|
| R | R′ | *S. aureus* | *E. coli* |
| N-C$_{12}$H$_{25}$ | H | 1,000 | 1,000 |
| N-C$_{18}$H$_{37}$ | H | 1,000 | 1,000 |
| N-C$_{12}$H$_{25}$ | —⟨ ⟩ | 1,000 | 1,000 |
| N-C$_{18}$H$_{37}$ | —⟨ ⟩ | 250 | 500 |
| N-C$_{12}$H$_{25}$ | —⟨ ⟩—Cl | 1,000 | 1,000 |
| N-C$_{12}$H$_{25}$ | —⟨ ⟩—Cl (Cl) | 1,000 | 1,000 |
| N-C$_{18}$H$_{35}$(Oleyl) | —⟨ ⟩—Cl (Cl) | 500 | 500 |

EXAMPLE II

The antibacterial properties of alpha-(arylamino)-benzylphosphinic acids and of their sodium salts have been evaluated by the procedure set forth in Example I, and the minimum concentrations required to inhibit the growth of *S. aureus* and *E. coli* are as follows:

| RNH—CHR′—PO$_2$H$_2$ | | Minimum concentration (p.p.m.) required to inhibit bacterial growth | | | |
|---|---|---|---|---|---|
| | | Free acid | | Na-salt | |
| R | R′ | *S. aureus* | *E. coli* | *S. aureus* | *E. coli* |
| ⟨ ⟩— | —⟨ ⟩ | 1,000 | 1,000 | 500 | 1,000 |
| Cl—⟨ ⟩— | —⟨ ⟩—Cl | 500 | 1,000 | 20 | 500 |
| Cl—⟨ ⟩— | —⟨ ⟩ (Cl) | 500 | 1,000 | 31 | 1,000 |
| Cl—⟨ ⟩— (Cl) | —⟨ ⟩ (Cl) | 125 | 1,000 | 20 | 1,000 |
| Cl—⟨ ⟩— (Cl) | —⟨ ⟩—Cl | 125 | 500 | 20 | 500 |
| Cl—⟨ ⟩— (Cl) | —⟨ ⟩—Cl (Cl) | 62 | 1,000 | 7.8 | 250 |
| Cl—⟨ ⟩— (Cl) | —⟨ ⟩—Cl | 62 | 1,000 | 7.8 | 1,000 |
| Cl—⟨ ⟩— (Cl) | —⟨ ⟩ (HO) | 62 | 500 | 62 | 1,000 |
| Cl—⟨ ⟩— (Cl) | —⟨ ⟩—NO$_2$ | 31 | 500 | 31 | 500 |

When the free acids set forth above in this example were tested for bacterial growth inhibition in the presence of soap, the minimum inhibitory concentrations were the same as those given for the sodium salts of the acids in the table above. The test of the acids in the presence of soap was a modified agar streak method as follows:

The various individual aminophosphinic compounds were incorporated at a 1.0% level in a 10% soap solution. The "soap" utilized was a neutral white toilet soap containing about 20% by weight of sodium coco soap and about 80% by weight of sodium tallow soap. The concentration of the particular aminophosphinic compounds in the soap solution was 1000 p.p.m., or 0.1%.

Varying amounts of the soap solution containing the aminophosphinic compounds were thoroughly dispersed into measured amounts of sterile liquid nutrient agar so as to obtain concentrations of the aminophosphinic compounds ranging from 1 to 1000 p.p.m. Plates were then poured, allowed to solidify, and streaked with a standard 4 mm. loopful of a 24-hour broth culture of either *Staphylococcus aureus* FDA 209 or *Escherichia coli* ATCC 11229. After incubation for 24 hours at 37° C., the bacteriostatic endpoint was determined. This endpoint represents the minimum concentration in p.p.m. of the bacteriostatic agent necessary to completely inhibit all growth of the inoculent organism.

EXAMPLE III

Alpha-(3,4-dichlorophenylamino) - 4' - hydroxybenzylphosphinic acid has been prepared as follows:

A Schiff's base from 3,4-dichloroaniline and p-hydroxybenzaldehyde was prepared by boiling equimolar amounts of the reactants in benzene, with azeotropic removal of water, followed by filtration and recrystallization from benzene. To 80 grams of Schiff's base in 200 milliliters ethanol, there was added 21 grams of 95 percent $H_3PO_2$ at 65 degrees C. After heating under reflux for two and one-half hours, the solution was cooled, 48 grams of 50 percent aqueous NaOH was added dropwise, and the reaction mixture was evaporated to dryness under vacuum. The residue was agitated with 300 milliliters warm water, cooled, and extracted with ether until the ether layer appeared completely colorless. From 8 to 9 extractions were required. The aqueous portion was freed from residual ether by heating and bubbling nitrogen through it. After cooling it was added dropwise, with rapid stirring, to 300 milliliters of approximately 3 N HCl. The precipitated phosphinic acid was redissolved in aqueous NaOH, the solution again extracted with ether, and the phosphinic acid reprecipitated by adding to aqueous HCl. After filtration and washing with water, the product was dried in vacuo over $P_2O_5$. The yield was 40 grams of a light yellow powder having a melting point of 147–149 degrees and an equivalent weight of 329 (calculated 332.1).

The equivalent weights were determined by potentiometric titration of the free acids with 0.1 N alcoholic KOH, using isopropanol, 1:1 isopropanolethylene glycol, or dimethyl-formamide as solvents.

Similar procedures were followed to obtain each of the aromatic phosphinic acids evaluated in Example II.

EXAMPLE IV

Alpha-(dodecylamino)-benzylphosphinic acid has been prepared as follows:

A Schiff's base was prepared from a mixture of 55.5 grams dodecylamine and 32 grams benzaldehyde in 150 milliliters benzene by heating under reflux until the calculated amount of water had separated (5.4 milliliters). The solution of the Schiff's base was then cooled to 50 degrees C., and 21 grams of 95 percent $H_3PO_2$ was added dropwise. The temperature rose to 63 degrees C. and the color became slightly darker. After two and one-half hours of further heating under reflux, the solution became turbid. It was then cooled, diluted with three volumes of ether, and left overnight at −10 degrees C.

The precipitate was then filtered, redissolved in hot benzene, filtered to remove turbidity, cooled, and reprecipitated by dilution with ether and cooling to −10 degrees C. After filtration, the material was washed with ether and dried over $P_2O_5$. Weight: 76 grams. Melting point (recrystallied from EtOH), 197–8 degrees. Acid equivalent weight (by potentiometric titration with 0.1 N alcoholic KOH in 1:1 isopropanol-glycol), calculated 339, found 338. Yield: 75 percent.

The same procedure was followed to obtain each of the alpha-(alkylamino)-benzylphosphinic acids evacuated in Example I.

EXAMPLE V

Octadecylaminomethylphosphinic acid has been prepared as follows:

To a boiling suspension of 11 grams paraformaldehyde (approximately 90 percent) in 100 milliliters benzene, a solution of 81 grams octadecylamine in 100 milliliters benzene was added dropwise during the course of 45 minutes. During the addition, 4.6 milliliters $H_2O$ had separated in the Stark and Dean trap. Heating under reflux was continued for two hours, until a total of 6.5 milliliters $H_2O$ had separated. The clear solution was decanted from approximately 1.2 grams residual paraformaldehyde, and heated for two more hours under reflux with 21 grams of 95 percent $H_3PO_2$. After cooling, the dilution with ether and purification was carried out as described in Example IV. Weight: 93 grams. Melting point (from EtOH): sinters at 90–100 degrees. Acid equivalent weight: calculated 347–5, found 381. Yield (based on titration): 82 percent.

The same procedure was followed to obtain the dodecylaminomethylphosphinic acid evaluated in Example I.

EXAMPLE VI

The ammonium or alkali metal salts of all of the aminophosphinic acids can be conveniently prepared by redissolving the acid in an equivalent amount of the appropriate aqueous hydroxide [NaOH, KOH, Ba(OH)₂, NH₄OH] and then evaporating to dryness under vacuum.

We claim:

1. An antibacterial composition comprising a water-soluble fatty acid soap and a bacteriostatically effective amount of aminophosphinic acids and salts thereof having the formula:

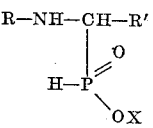

wherein R is selected from the group consisting of an alkyl radical having from 12 to 18 carbon atoms, phenyl and chlorine-substituted phenyl radicals; wherein R' is selected from the group consisting of hydrogen, phenyl, halogen-substituted phenyl radicals, nitro-substituted phenyl radicals and hydroxyl-substituted phenyl radicals; and wherein X is selected from the group consisting of hydrogen, alkali metal and ammonium.

2. The composition of claim 1 wherein said aminophosphinic compound has the formula:

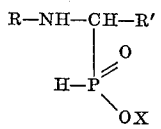

wherein R is a chlorine-substituted phenyl radical; R' is selected from the group consisting of chlorine-substituted phenyl radicals, nitro-substituted phenyl radicals and hydroxyl-substituted phenyl radicals; X is selected from the group consisting of hydrogen and sodium; and wherein said amount is from 0.5 to about 5:0% by weight of said soap.

3. The composition of claim 1 wherein said aminophosphinic compound has the formula:

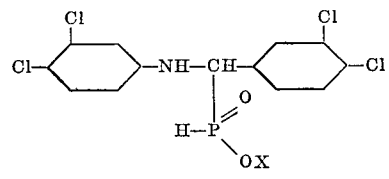

wherein X is selected from the group consisting of hydrogen and sodium.

4. The composition of claim 3 wherein said aminophosphinic compound is (3,4-dichlorophenylamino)-3'4'-dichlorobenzylphosphinic acid.

5. The composition of claim 1 wherein said aminophosphinic compound has the formula:

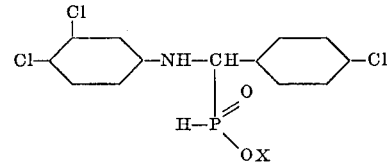

wherein X is selected from the group consisting of hydrogen and sodium.

6. The composition of claim 5 wherein said aminophosphinic compound is (3,4-dichlorophenylamino)-3'-chlorobenzylphosphinic acid.

References Cited
UNITED STATES PATENTS 3,159,537 12/1964 Takesue et al. _____ 260—500
3,160,632 12/1964 Toy et al. _____ 260—500

MAYER WEINBLATT, Primary Examiner

P. E. WILLIS, Assistant Examiner

U.S. Cl. X.R.
252—106